United States Patent [19]

Stoll

[11] Patent Number: 5,235,439
[45] Date of Patent: Aug. 10, 1993

[54] VOLUME-HOLOGRAPHIC INNER PRODUCT PROCESSOR

[75] Inventor: Harold M. Stoll, Rancho Palos Verdes, Calif.

[73] Assignee: Northrop Corporation, Hawthorne, Calif.

[21] Appl. No.: 811,589

[22] Filed: Dec. 20, 1991

Related U.S. Application Data

[63] Continuation-in-part of Ser. No. 220,769, Jul. 18, 1988, abandoned.

[51] Int. Cl.$^5$ ............................................. G03H 1/16
[52] U.S. Cl. ................................. 359/7; 359/561; 359/559; 382/31; 382/42; 364/822; 364/827; 395/25
[58] Field of Search ................. 359/4, 7, 559, 561, 359/560; 382/31, 42; 364/822, 827; 395/25

[56] References Cited

U.S. PATENT DOCUMENTS

| | | |
|---|---|---|
| 4,449,785 | 5/1984 | Huignard et al. |
| 4,595,994 | 6/1986 | Verber et al. ................ 364/841 |
| 4,862,406 | 8/1989 | Fisher ............................... 395/25 |
| 5,099,434 | 3/1992 | Stoll et al. ................... 364/822 |
| 5,132,835 | 7/1992 | Stoll et al. ................... 369/103 |

FOREIGN PATENT DOCUMENTS 2221329A  1/1990  United Kingdom.

OTHER PUBLICATIONS

"Statistical Theory of Signal Detection" by Carl W. Helstrom, Pergamon Press, 2nd Edition, 1968 pp. 102–147.

D. Gabor "Character Recognition by Nolography" *Nature*, 208, p. 422 (1965).

J. T. La Macchia et al. "Coded Multiple Exposure Holograms", Applied Optics, 7, p. 91 (1968).

C. N. Kurtz "The Transmittance Characteristics of Surface Diffusers and the Design of Nearly Band-Limited Binary Diffusers" Journal of Optical Society of America, vol. 62, 1972.

T. Jannson et al., "The Interconnectability of Neuro-Optic Processors" Proceedings of the International Society for Optical Engineering vol. 968, p. 157 (1986).

D. L. Staebler et al. "Multiple Storage and Exposure of Fixed Holograms in Fe-Doped LiNbO$_3$" Applied Physics Letters, vol. 26, p. 182 (1975).

J. R. Leger et al. "Hybrid Optical Processor for Pattern Recognition and Classification Using a Generalized Set of Pattern Functions" Applied Optics vol. 21, No. 2, Jan. 1982.

D. A. Gregory et al. "Large-Memory Real-Time Multi-Channel Multiplexed Pattern Recognition", Applied Optics, 23, p. 4560 (1984).

*Primary Examiner*—Bruce Y. Arnold
*Assistant Examiner*—J. P. Ryan
*Attorney, Agent, or Firm*—Terry J. Anderson; Robert B. Block; Karl J. Hoch, Jr.

[57] ABSTRACT

A pattern recognition apparatus and a method for operating same. The apparatus includes a volume holographic medium (4) having a plurality of Fourier-space volume holograms representing pattern templates stored within. The apparatus further includes a spatial light modulator (1) and a phase encoder (2). The phase encoder has an output optically coupled to the medium by a first Fourier transform lens (3). The spatial light modulator spatially modulates a spatially uniform laser beam (7) in accordance with an unknown pattern. The two-dimensional phase encoder causes the spatially modulated laser beam to be spatially distributed prior to application to the medium. The apparatus further includes a detector (6, 11) having an input optically coupled by a second Fourier transform lens (5) means to an angular spectrum of plane waves generated by the medium in response to the output of the spatial modulator, phase encoder, and first Fourier lens. The detector detects plane waves that correspond to vector inner products generated within medium (4) in response to the unknown pattern.

14 Claims, 5 Drawing Sheets

VOLUME-HOLOGRAPHIC INNER PRODUCT PROCESSOR

CROSS-REFERENCE TO RELATED PATENT APPLICATION

This patent application is a continuation-in-part of U.S. patent application Ser. No. 07/220,769, filed Jul. 18, 1988, "Optical Neural Network", by H. M. Stoll et al now abandoned.

BACKGROUND OF THE INVENTION

Pattern recognition involves a comparison of an unknown pattern with a large number of templates (or known patterns) to determine which template the unknown pattern is most similar to. A known, statistically optimal measure of similarity (for unknown patterns embedded in additive white noise) is the vector inner product (see, for example, C. W. Helstrom, *Statistical Theory of Signal Detection*, Pergamon Press, N.Y., 1968). The vector inner product between an unknown pattern and a template is obtained by computing the product of the value of each resolution element or pixel of the unknown pattern with the value of each corresponding resolution element or pixel of the template, and then summing all the products. The unknown pattern is said to match "best" with, or to be recognized as being, the template with which it has the largest vector inner product.

Pattern recognition problems, in which unknown patterns and templates are two-dimensional images, typically involve many ($>10^3$), high-resolution ($>10^4$ pixels) templates. Real-time ($\sim 10^{-4}$ second recognition time) problems of this type therefore require computational throughputs of $>10^{11}$ arithmetic operations per second (=number of pixels per template $\times$ number of templates $\div$ the recognition time). No available or projected digital electronic computers can process information at this rate.

Optical template matchers in which templates are stored in the form of two-dimensional Fourier-space transforms include those described by: D. Gabor in "Character Recognition by Holography" in *Nature*, 208, p. 422 (1965); J. T. La Macchia and D. L. White in "Coded Multiple Exposure Holograms," Applied Optics, 7, p. 91 (1968); J. R. Leger and S. H. Lee in "Hybrid Optical Processor for Pattern Recognition and Classification Using a Generalized Set of Pattern Functions," D. A. Gregory and H. K. Liu in "Large-Memory Real-Time Multi-channel Multiplexed Pattern Recognition," Applied Optics, 23, p. 4560 (1984); and D. Psaltis, M. A. Neifeld, and A. Yamamura in "Image Correlators Using Optical Memory Disks," 14, p. 429 (1989).

Additionally, in a paper by T. Jannson, H. M. Stoll, and C. Karaguleff ("The interconnectability of neuro-optic processors," Proceedings of the International Society for Optical Engineering, Vol. 698, p. 157 (1986)) there is described, on page 162, an optical volume-holographic architecture for computing inner products. The disclosure is, however, in the context of providing interconnects for an optical neural network.

It is one object of this invention to provide a method and apparatus that employs a three-dimensional volume holographic medium to provide an optical template matcher capable of storing a very large number of templates.

It is a further object of the invention to provide a compact (potentially less than 200 cubic inches), low-power (potentially less than 10 watts of prime electrical power) optical template matcher capable of executing at least $10^{11}$ arithmetic operations per second.

SUMMARY OF THE INVENTION

In accordance with the invention templates are stored in the form of three-dimensional, Fourier-space volume holograms. All templates are accessed simultaneously (in parallel) by illuminating the volume holograms with the Fourier-transform of the unknown pattern. Inner products are determined by measuring the properties of the light radiated by the volume holograms: the angle of each of the light rays radiated indexes the inner product (i.e., indicates which template is being compared with the unknown pattern) while the amplitude of each of the light rays radiated is proportional to the magnitude of the indexed inner product.

In addition to providing computational throughputs far in excess of available or projected digital electronic template matching devices, the present invention enables more template information (the product of template count and template size) to be accessed in parallel than do the aforementioned conventional optical template matchers, wherein templates are stored in the form of two-dimensional Fourier-space holograms. The ratio of storage capacities (storage capacity of a three-dimensional-hologram device divided by the storage capacity of a two-dimensional-hologram device) is equal to the maximum (linear) space-bandwidth product, or number of linearly ordered resolution elements, that can be achieved in an optical system. The latter number is typically on the order of 3,000.

More specifically, the invention provides a pattern recognition apparatus and a method for operating same. The apparatus includes a volume-holographic medium having a plurality of Fourier-space volume holograms representing stored templates. The apparatus further includes a spatial light modulator and a phase encoder. The phase encoder has an output optically coupled to the volume-holographic medium by a first Fourier transform lens. The spatial light modulator spatially modulates a spatially uniform laser beam in accordance with an unknown pattern which has been loaded into the spatial light modulator. The two-dimensional phase encoder causes the spatially modulated laser beam to be spatially distributed prior to application to the volume-holographic medium. The apparatus further includes a detector having an input optically coupled by a second Fourier transform lens means to an angular spectrum of plane waves generated by the volume-holographic medium in response to the output of the spatial modulator, phase encoder, and first Fourier lens. The detector detects focused plane waves that correspond to vector inner products generated within the volume-holographic medium in response to the unknown pattern vector.

BRIEF DESCRIPTION OF THE DRAWINGS

The above set forth and other features of the invention are made more apparent in the ensuing Detailed Description of the Invention, when read in conjunction with the attached drawings, wherein.

DETAILED DESCRIPTION OF THE INVENTION

Figure 1:
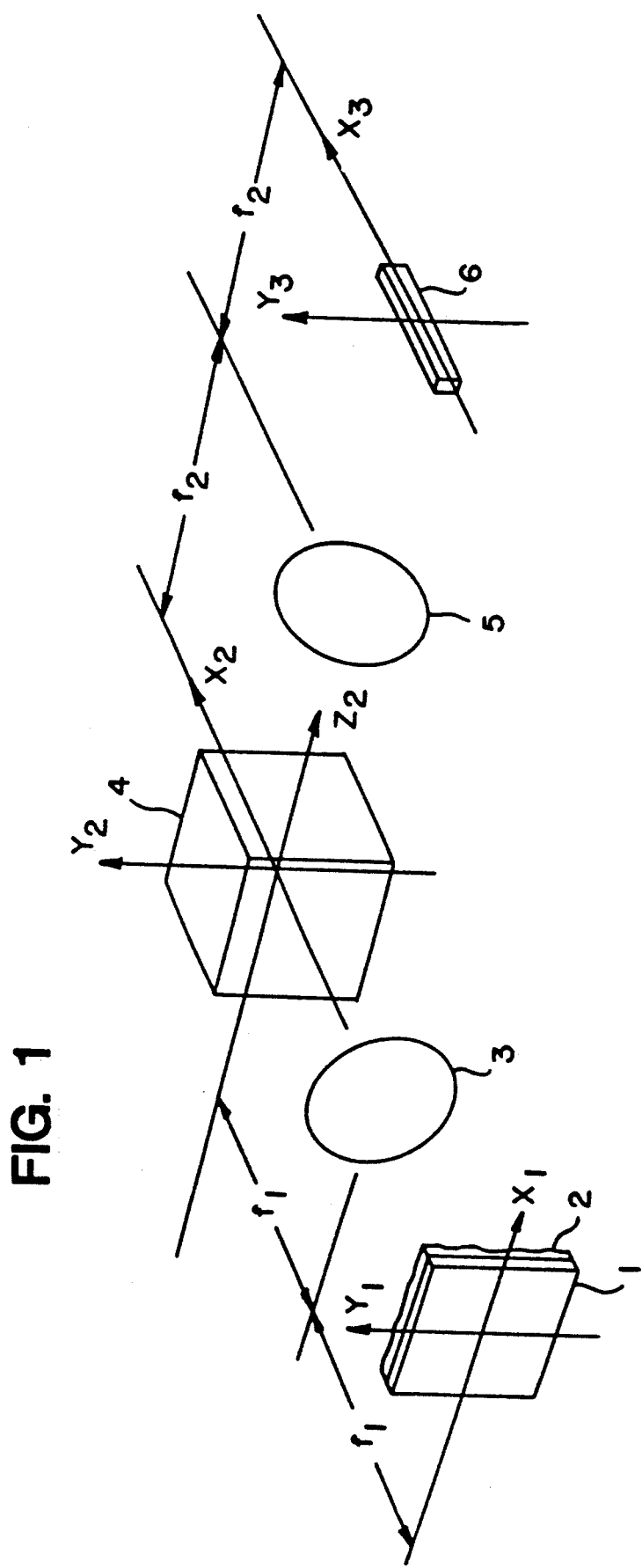
FIG. 1 is a perspective drawing of a Holographic Inner Product (HIP) processor of the invention.

The holographic inner product (HIP) processor of FIG. 1 performs massively parallel template matching. Templates are stored within the HIP processor in the form of Fourier-space volume holograms and are compared with an unknown pattern through the use of a modified Vander Lugt filter architecture (A. B. Vander Lugt in "Signal detection by complex spatial filtering," IEEE Transactions on Information Theory, Vol. IT-20, p. 2 (1964)). Comparisons are computed in the form of vector inner products. That is, the arithmetic value of each element, or pixel, of the unknown pattern is multiplied by the arithmetic value of each corresponding element, or pixel, of each template and a sum is taken over all products for each template. The HIP processor performs these multiplications and product summations in a simultaneous, high-speed parallel manner.

Mathematically, the HIP processor performs the following computation;

$$f_k = \vec{\sigma} \cdot \vec{v}^k; \quad k=1,2, \ldots, K, \quad (1)$$

where $f_k$ is the inner product between the unknown pattern vector, $\vec{\sigma}$ (the lexicographically ordered representation of the unknown pattern, $\sigma$, where each resolution element or pixel of $\sigma$ corresponds to a specific element of $\vec{\sigma}$); $\vec{v}^k$ is a template vector (which, for all k, bears the same lexicographic ordering as $\sigma$); and K is the total number of templates.

A perspective illustration of the HIP processor is shown in FIG. 1. The HIP processor includes a two-dimensional spatial light modulator (SLM) 1, a two-dimensional phase encoder 2, a first Fourier transform lens 3, a medium 4 in which volume holograms are stored, a second Fourier transform lens 5, and a linear detector array 6.

In FIG. 1 the SLM 1 includes means for electronically inputting a template or pattern. By way of example only, the SLM 1 may be comprised of a liquid crystal (LC) projection display device having a plurality of pixels that are modified in response to input from, for example, a digital computer. The use of a LC projection display device enables a new input template to be stored within the medium 4 every, for example, 1/30th of a second. Any one of a number of spatial light modulator types may be employed. These include ferroelectric liquid crystal, twisted nematic liquid crystal, silicon membrane (deformable mirror), and magneto-optic types. In other embodiments of the invention, the SLM 1 may be simply a transparent substrate having a pattern formed thereon. The two-dimensional phase encoder 2 causes the optical signal that passes through the SLM 1 to be spatially distributed prior to application to the medium 4. This function may be accomplished by constructing the phase encoder 2 from a transparent substrate, such as glass, and providing an etched random pattern on a surface of the substrate. The linear dimension of the smallest feature of the random pattern defines the coherence length of the phase encoder 2. The significance of the coherence length of the phase encoder is discussed below. Fourier transform lenses 3 and 5 are typically spherical lenses. A presently preferred volume hologram medium 4 is comprised of iron-doped lithium niobate (LiNbO$_3$: Fe). Representative dimensions of the active volume of the medium 4 are one centimeter on a side. Holograms may be "permanently" fixed by heating the LiNbO$_3$: Fe to approximately 160° C. for approximately twenty-five seconds (see, for example, D. L. Staebler, W. J. Burk, W. Phillips, and J. J. Amodei in "Multiple storage and exposure of fixed holograms in Fe-doped LiNbO$_3$," Applied Physics Letters, Vol. 26, p. 182 (1975)). Holograms fixed in such a manner are estimated to have a half-life of approximately 100,000 years at room temperature. Other suitable volume hologram media include, by example, strontium barium niobate (SrBaNbO$_3$), photorefractive photopolymers, and photochemical photopolymers. The linear detector array 6 may be, for example, a charge-coupled device (CCD), a self-scanned diode array, a Schottky diode array, or a pyroelectric device array. The linear detector array 6 has a resolution, or number of photoresponsive elements, equal to the number of templates stored within medium 4.

Figure 2:
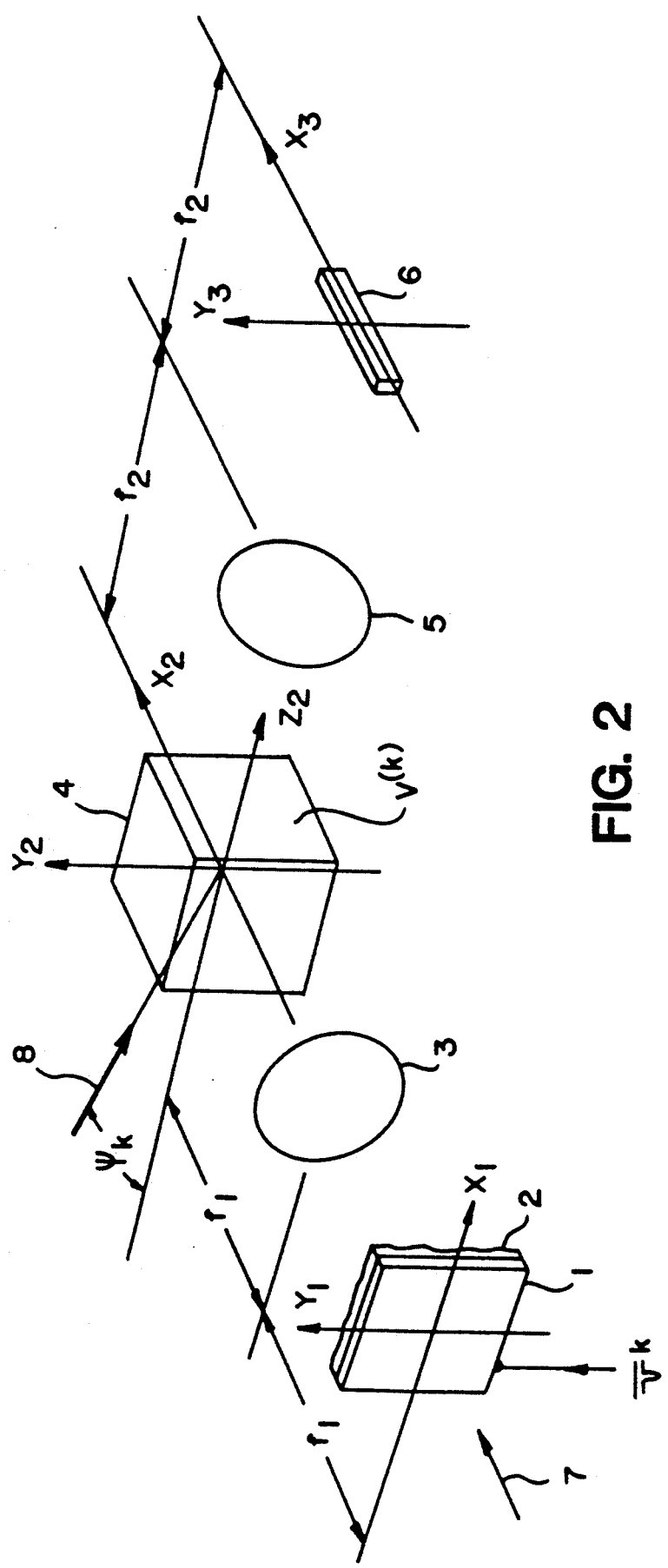
FIG. 2 is a perspective drawing of the HIP processor illustrating the storage of a single template $\vec{v}^k$ of a sequence of templates (k=1,2, ... K)

FIG. 2 illustrates the use of the HIP processor for storing templates within the medium 4. Templates are stored within medium 4 in the following manner:

1. template $\vec{v}^k$ is loaded into SLM 1 using a predetermined and fixed lexicographic ordering scheme;
2. SLM 1 spatially modulates a spatially uniform, plane-wave laser beam 7;
3. phase encoder 2 multiplies the light pattern transmitted by SLM 1 by a random, two-dimensional phase encoding function;
4. first Fourier transform lens 3 (which is positioned one focal length (f$_1$) from phase encoder 2 and one focal length (f$_1$) from the midpoint of medium 4) generates (at approximately the midpoint of medium 4) the Fourier transform of the light pattern transmitted by phase encoder 2;
5. simultaneously with step (4), reference plane-wave laser beam 8 (which is temporally coherent with plane-wave laser beam 7) illuminates medium 4 at angle $\Psi_k$ to the $z_2$-axis of medium 4 and within the $x_2 - z_2$ plane; and
6. template hologram $V^k$ forms within medium 4.
7. This procedure is repeated for k=1,2, ..., K until all Fourier-space holograms $V^k$(k=1,2, ..., K) have been stored within medium 4.

As employed herein, a predetermined and fixed lexicographic ordering scheme is intended to mean that input patterns are presented to the system in a consistent manner. For example, if the input pattern is derived from a television camera having a plurality of scanlines, the scanlines are input in the same order for each pattern. The scanlines need not be input sequentially, so long as they are input consistently.

The plane-wave laser beam 7 may originate from, for example, an argon-ion laser having a wavelength of 4875 angstroms. The reference plane-wave laser beam 8 originates from the same source. It is also within the scope of the invention to maintain the medium 4, if comprised of iron-doped lithium niobate, at a temperature of approximately 130° C. while the templates are being inputted. This results in a simultaneous storing and fixing of the templates. For this case, some shrinkage of the medium 4 occurs when same is cooled and the plane-wave laser beam 7 is required to have a slightly shorter wavelength so as to compensate for the shrinkage of the material when applying an unknown pattern to the HIP processor.

During the storage of templates within the medium 4 the phase encoder 2 beneficially diffuses or spreads out the light energy so that the energy is uniformly distributed throughout the volume of the medium 4. If the phase encoder 2 were not used the light energy from successive templates would be focussed to within a small region within the volume of the medium 4. This would result in a reduction in storage capacity and an increase in optical crosstalk.

Also during the storage of templates, the reference laser beam is scanned through a plane of the medium 4. For example, the reference plane-wave laser beam 8 is scanned through plus or minus five degrees, referenced to the center of the medium 4, in 0.01 degree increments. That is, after a template is stored, the reference plane-wave laser beam 8 is shifted by 0.01 degrees before the storage of a next template.

Figure 3:
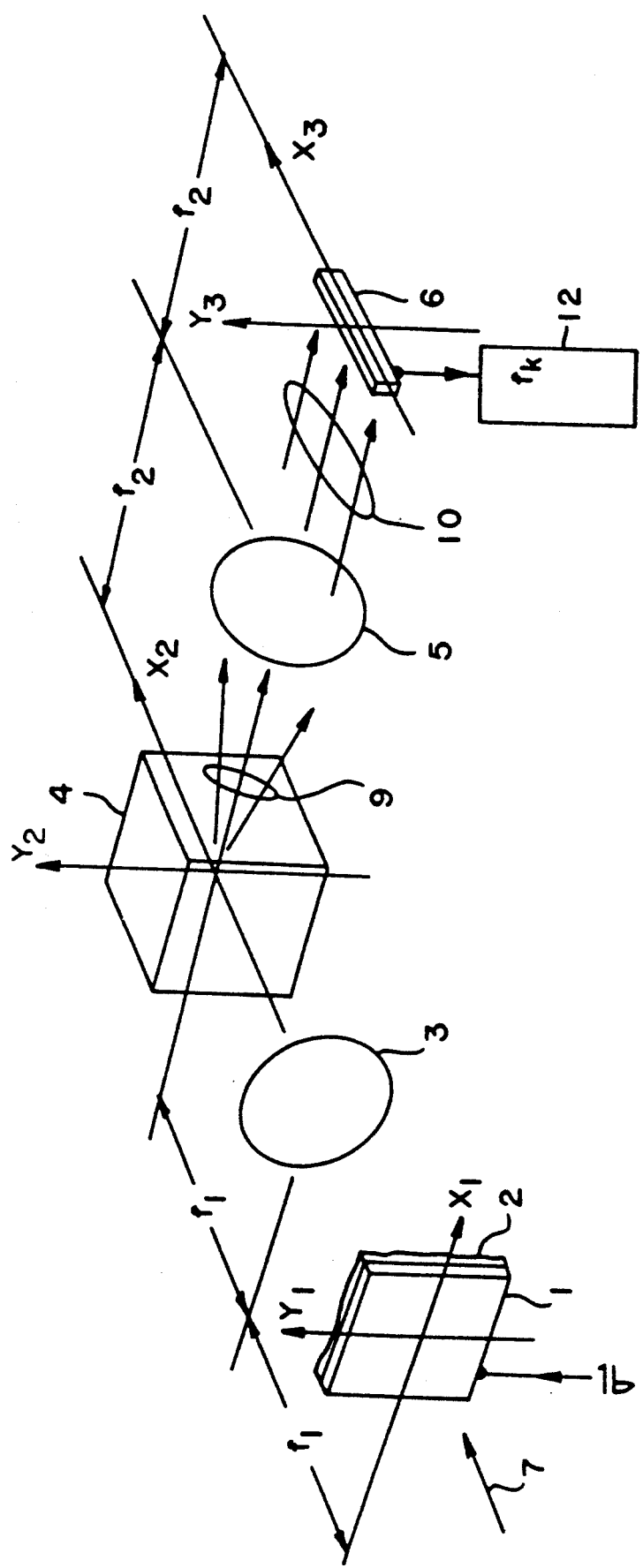
FIG. 3 is a perspective drawing of the HIP processor illustrating the simultaneous generation of K vector inner products $f_k$(k=1,2, ... K)

FIG. 3 illustrates the generation of vector inner products. The inner products, $f_k$, are generated in the following manner:

1. unknown pattern vector $\vec{\sigma}$ is loaded into SLM 1 using the same pre-determined and fixed lexicographic ordering scheme used to load the $\vec{v}^k$;
2. SLM 1 spatially modulates the plane-wave laser beam 7;
3. phase encoder 2 multiplies the light pattern transmitted by SLM 1 by a random, two-dimensional phase encoding function;
4. first Fourier transform lens 3 generates (at approximately by the midpoint of medium 4) the Fourier transform of the light pattern transmitted by phase encoder 2;
5. volume hologram medium 4 generates an angular spectrum of plane waves 9 with amplitudes proportional to $\vec{\sigma} \cdot v^k$ (k=1, 2, ..., K) and propagation angles of $\Psi_k$ (k=1, 2, ..., K) which are identical to reference plane-wave angles $\Psi_k$;
6. second Fourier transform lens 5 located one focal length ($f_2$) from the midpoint of medium 4, focuses each plane wave (of the angular spectrum of plane waves) generated within volume hologram medium 4 onto linear detector array 6 located one focal length ($f_2$) from second Fourier transform lens 5; and
7. inner products $f_k$ (corresponding to focused plane waves 10 emergent from second Fourier transform lens 5) are read out of detector array 6. A processor 12 is preferably coupled to the detector array 6 for receiving the inner products $f_k$ therefrom.

The above-described determination of $f_k (=\vec{\sigma} \cdot \vec{v}$; k=1, 2, ..., K) may be understood in greater detail by considering the electric field distributions which, under appropriate conditions, exist at various points within the HIP processor. Accordingly, referring to FIG. 4, for an electric field distribution incident on volume hologram medium 4 given by $$E^{(1)} = F\{\sigma \cdot e^{i\beta}\}, \tag{2}$$

where $\sigma$ is the two-dimensional electric field distribution which corresponds to $\vec{\sigma}$; $\beta$ is the two-dimensional phase encoding function characteristic of phase encoder 2 (see, for example, C. N. Kurtz in "The transmittance characteristics of surface diffusers and the design of nearly band-limited binary diffusers," Journal of the Optical Society of America, Vol. 62, p. 982 (1972)); and $F\{\cdot\}$ denotes Fourier transform; and for a refractive index distribution within volume hologram medium 4 proportional to $$\sum_k [|A^k|^2 + |v^k|^2 + (A^k)^* v^k + A^k (v^k)^*], \tag{3}$$

where $A^k$ is the amplitude of reference plane-wave laser beam 8 associated with template $v^k$, $(\cdot)^*$ denotes complex conjugate, and $v^k$ is the two-dimensional field distribution given by $$v^k = F\{v^k \cdot e^{i\beta}\}; \tag{4}$$

the electric field distribution within the plane of linear detector array 6 is given by $$E^{(2)} = \sum_k \alpha^k * [(v^k \cdot e^{i\beta}) \star (\sigma \cdot e^{i\beta})], \tag{5}$$

where $\alpha^k$ is the inverse Fourier transform of $A^k$, "*" denotes convolution, and "$\star$" denotes correlation.

Figure 4:
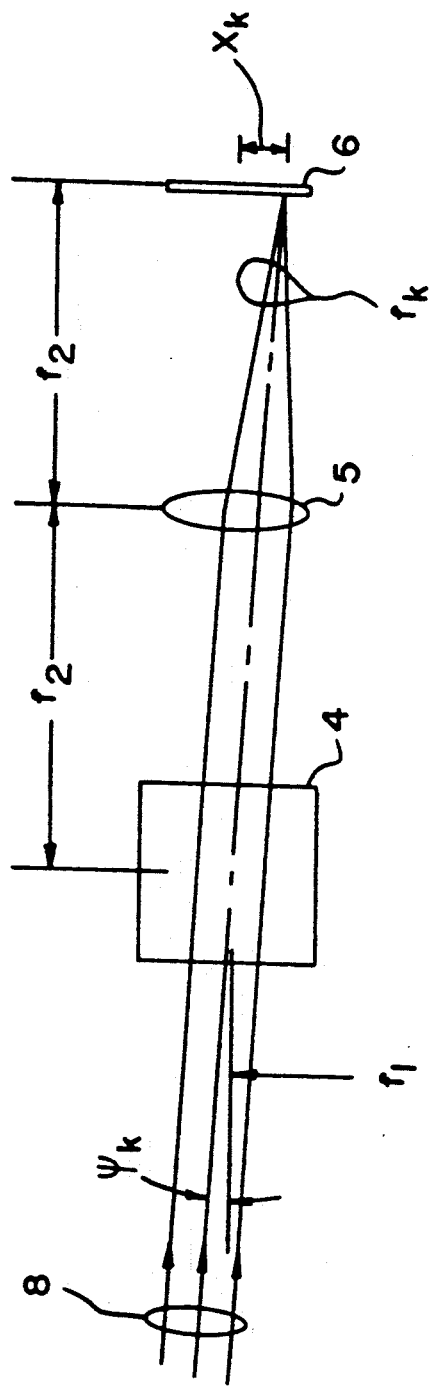
FIG. 4 is a plan view of the HIP processor illustrating the generation and detection of a single vector inner product, $f_k$.

Spatial filtering of $E^{(2)}$ within the plane of detector array 6 (the correlation plane) is performed both within and perpendicular to the plane of FIG. 4. The inner product is detected in the form of light energy incident on detector array 6 a distance $x_k$ from the center of array 6 (the common optical axis of lens 5 and holographic storage medium 4).

In-plane spatial filtering occurs as a natural result of Bragg selectivity within the volume hologram medium 4 (see, for example, T. Jannson, H. M. Stoll, and C. Karaguleff in "The interconnectability of neuro-optic processors," Proceedings of the International Society for Optical Engineering, Vol. 698, p. 157 (1986)). Spatial filtering perpendicular to the plane of the processor occurs as a result of phase encoder 2's autocorrelation function being much narrower ($\sim$ ten times) than either the autocorrelation function of $\sigma$ or any of the autocorrelation functions of the $v^k$. These spatial filtering effects yield for the field distribution within the correlation plane:

$$E^{(3)} = \sum_k \alpha^k \cdot \int \int v^k \cdot \sigma \, d\vec{r}, \tag{6}$$

where the coherence length of phase encoder 2 is assumed to be significantly smaller than (e.g., less than 10% as large as) the smallest linear dimension of a resolution element of either $\sigma$ or any of the $v^k$. The double integral in Equation (6) is taken over the correlation plane. $E^{(3)}$ may, following lexicographic ordering, be re-written as:

$$E^{(3)} = \sum_k \delta(x - x_k) \cdot [\vec{v}^k, \vec{\sigma}], \tag{7}$$

where, for reference plane-wave laser beams $A^k$, $$a_k = \delta(x - x_k); \qquad (8)$$

$\delta(\cdot)$ is the dirac delta function; the x-dimension lies both within the correlation plane and within the plane of the holographic inner product processor; and $[\cdot, \cdot]$ denotes vector inner product. Field $E^{(3)}$ represents the inner product of $\vec{\sigma}$ with each of the templates $v^k$, which is the desired result.

Although described in the context of a bulk right-angle geometry system it should be realized that the hologram geometry may be provided instead in a transmission or a reflection (Lippmann) geometry.

Figure 5:
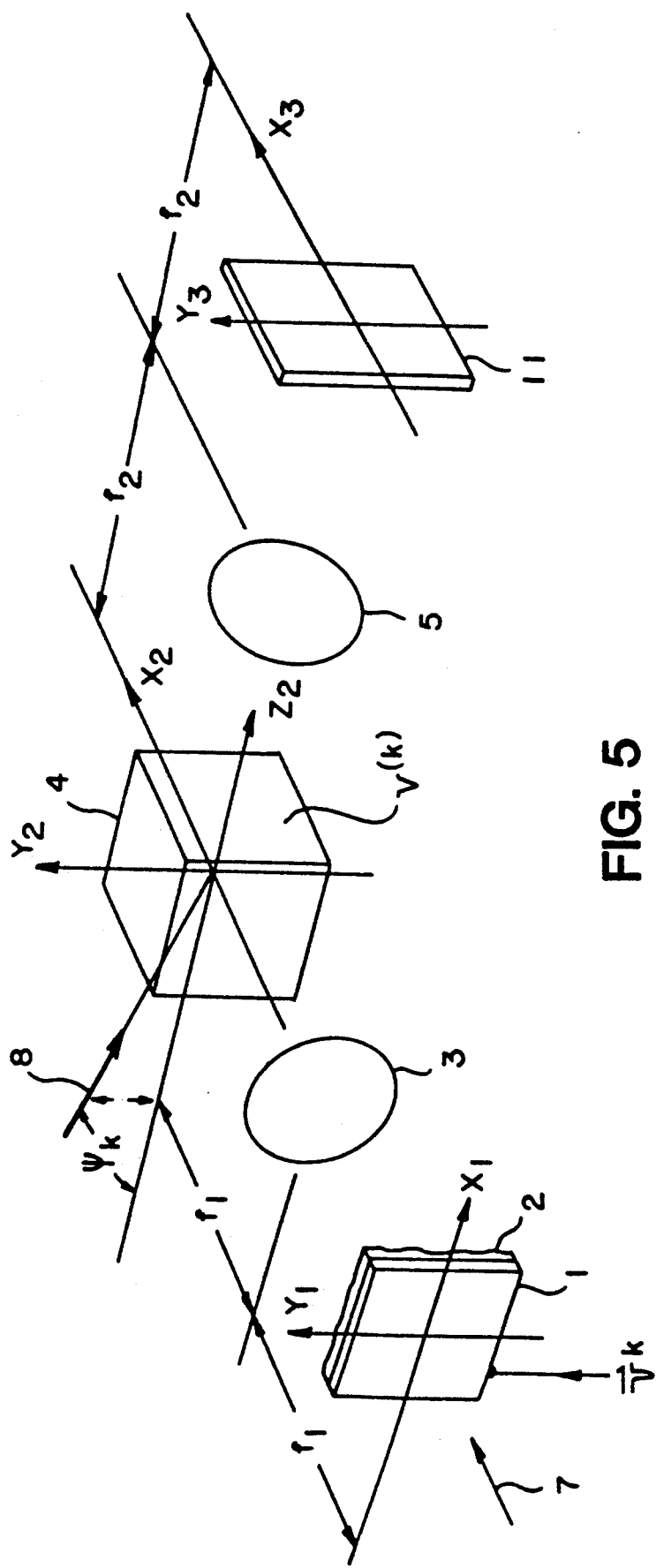
FIG. 5 is a perspective drawing of a further embodiment of a HIP processor illustrating the storage of a single template $\vec{v}^k$ of a sequence of templates (k=1,2, ... K), this embodiment employing a reference plane-wave laser beam that is scanned in two dimensions in conjunction with a two-dimensional detector array.

Also, although the invention has been described as using a linear array of detectors 6 disposed along the correlation plane it should be realized that, as illustrated in FIG. 5, a two-dimensional detector array 11 may be employed for a system that scans, during template storage, the reference laser beam 8 in two dimensions. The two-dimensional detector array 11 may then be a staring type array. In this case, fractal storage geometry considerations are employed to select reference laser beam 8 angles so as to avoid crosstalk within the medium 4. Reference is made to a Ph.D. thesis entitled "Optical Neural Networks Using Volume Holograms" by Claire Xiang-Guang Gu, Calif. Institute of Technology, submitted Sep. 19, 1989.

This invention has been described in conjunction with the illustrative embodiments enumerated above. It will be evident to those skilled in the art that various alterations, modifications, and variations may be made to the illustrative embodiments without departing from the spirit and scope of the claims appended hereto. For these reasons, this invention is not to be construed as being limited to only the illustrative embodiments, but should only be construed by reference to the appended claims.

What is claimed is:

1. Pattern recognition apparatus, comprising:
   a volume holographic medium having a plurality of Fourier-space volume holograms representing pattern templates stored within;
   means, having an output optically coupled to said medium by a first Fourier transform lens means, for spatially modulating a spatially uniform laser beam in accordance with an unknown pattern; and
   means, having an input optically coupled by a second Fourier transform lens means to an angular spectrum of plane waves generated by said medium in response to the output of said spatial modulating means, for detecting plane waves that correspond to vector inner products generated within said medium in response to the unknown pattern.

2. Pattern recognition apparatus as set forth in claim 1 wherein said spatial modulating means further includes means for phase encoding the spatially modulated spatially uniform laser beam in accordance with a random, two-dimensional phase encoding function.

3. Pattern recognition apparatus as set forth in claim 1 wherein said angular spectrum of plane waves generated by said medium have amplitudes proportional to $\vec{\sigma} \cdot \vec{v}^k (k = 1, 2, \ldots, K)$ and propagation angles of $\Psi_k (k = 1, 2, \ldots, K)$ which correspond to reference plane-wave laser beam angles $\Psi_k$.

4. Pattern recognition apparatus as set forth in claim 1 wherein said detector means includes a linear array of photoresponsive elements disposed within and along a correlation plane of said second Fourier transform lens.

5. Pattern recognition apparatus as set forth in claim 4 wherein said medium provides spatial filtering, within the correlation plane, of an electric field distribution, the spatial filtering being provided in accordance with the Bragg selectivity of said volume holographic medium.

6. Pattern recognition apparatus as set forth in claim 1 wherein said spatial modulating means further includes means for phase encoding the spatially modulated laser beam in accordance with a random, two dimensional phase encoding function, wherein said detector means includes a linear array of photoresponsive elements disposed within and along a correlation plane of said second Fourier transform lens, and wherein said phase encoding means has an associated autocorrelation function selected to provide spatial filtering, in a plane perpendicular to the correlation plane, of an electric field distribution.

7. Pattern recognition apparatus as set forth in claim 1 wherein said medium is comprised of a material selected from the group consisting of iron-doped lithium niobate ($LiNbO_3$: Fe), strontium barium niobate ($SrBaNbO_3$), photorefractive photopolymers, and photochemical photopolymers.

8. Pattern recognition apparatus as set forth in claim 1 wherein said spatial light modulator means is comprised of means selected from the group consisting of ferroelectric liquid crystal devices, twisted nematic liquid crystal devices, deformable mirror devices, and magneto-optic devices.

9. Pattern recognition apparatus as set forth in claim 1 wherein said detector includes a two-dimensional array of photoresponsive elements.

10. A method for storing Fourier-space holograms within a volume holographic medium, comprising the steps of, for $k = 1, 2, \ldots, K$ Fourier-space holograms $V^k (k = 1, 2, \ldots, K)$:
    loading a template $\vec{v}^k$ into a spatial light modulator means using a predetermined and fixed lexicographic ordering scheme;
    spatially modulating a first plane-wave laser beam in accordance with the loaded template;
    multiplying a light pattern transmitted by the spatial light modulator means in accordance with a random, two-dimensional phase encoding function;
    applying the phase encoded light pattern, with a first Fourier transforms lens means, to approximately a midpoint of the volume holographic medium so as to generate, at the midpoint, a Fourier transform of the phase encoded light pattern while simultaneously applying a second plane-wave laser beam, which is temporally coherent with first plane-wave laser beam, so as to illuminate the medium at an angle $\Psi_k$ to a $z_2$-axis of the medium and within a $x_2 - z_2$ plane; and
    forming a template hologram $V^k$ within the medium.

11. A method as set forth in claim 10 wherein the step of simultaneously applying the second plane-wave laser beam includes an initial step of scanning the second plane-wave laser beam by a predetermined scan increment within a plane.

12. A method as set forth in claim 10 wherein the step of simultaneously applying the second plane-wave laser beam includes an initial step of scanning the second plane-wave laser beam by a predetermined scan increment within a first plane and within a second plane orthogonal to the first plane.

13. A method as set forth in claim 10 and including a step of quasi-permanently fixing the template hologram within the medium.

14. A method for generating vector inner products ($f_k$) for accomplishing pattern recognition, comprising the steps of:

loading an unknown pattern vector $\vec{\sigma}$ into a spatial light modulator means using a same pre-determined and fixed lexicographic ordering scheme that was initially employed to store a $\vec{v}^k$ template into a volume holographic medium;

spatially modulating a first plane-wave laser beam in accordance with the unknown pattern vector;

employing a phase encoder means to multiply the spatially modulated light pattern by a random, two-dimensional phase encoding function;

generating within the medium, with a first Fourier transform lens means, a Fourier transform of the phase encoded light pattern;

generating, with the volume holographic medium, an angular spectrum of plane waves having amplitudes proportional to $\vec{\sigma} \cdot \vec{v}^k (k=1,2,\ldots,K)$ and propagation angles of $\Psi_k (k=1,2,\ldots,K)$ which correspond to reference plane-wave coherent optical signal angles $\Psi_k$;

focussing onto a detector means, with a second Fourier transform lens means, plane waves of the angular spectrum of plane waves generated within the volume holographic medium; and reading out, from the detector means, signals representing vector inner products corresponding to the plane waves focussed upon the detector means.

* * * * *